United States Patent [19]
Harle et al.

[11] Patent Number: 5,938,816
[45] Date of Patent: Aug. 17, 1999

[54] PROCESS FOR PURIFYING GASES LOADED IN PARTICULAR WITH CHEMICAL RESIDUES

[75] Inventors: Rainer Harle, Schwieberdigen; Winfried Marquardt, Nuremberg, both of Germany

[73] Assignee: Firma Maul & Co. - Chr. Belser GMBH, Nuremberg, Germany

[21] Appl. No.: 08/855,225

[22] Filed: May 13, 1997

Related U.S. Application Data

[63] Continuation of application No. PCT/DE96/00889, May 22, 1996.

[30] Foreign Application Priority Data

Sep. 14, 1995 [DE] Germany .......................... 195 34 008

[51] Int. Cl.$^6$ ............................................. B01D 53/04
[52] U.S. Cl. .................................. 95/10; 95/17; 95/106; 95/115; 95/143; 96/111; 96/112; 96/122; 96/130; 96/145
[58] Field of Search ................................... 95/10, 14, 17, 95/18, 99, 106, 114, 115, 141, 143; 96/111, 112, 121, 122, 130, 133, 145

[56] References Cited

U.S. PATENT DOCUMENTS

| | | | |
|---|---|---|---|
| Re. 29,941 | 3/1979 | Bird ....................................... | 96/111 X |
| 2,635,707 | 4/1953 | Gilmore ................................. | 96/122 |
| 2,995,208 | 8/1961 | Hachmuth et al. ................... | 96/122 X |
| 3,006,438 | 10/1961 | de Yarmett ........................... | 96/122 X |
| 3,222,849 | 12/1965 | Fischer ................................... | 96/112 |
| 3,289,390 | 12/1966 | Humphries ............................ | 96/122 X |
| 3,477,204 | 11/1969 | Jackson ................................. | 96/112 X |
| 3,479,797 | 11/1969 | Spencer et al. ....................... | 96/122 X |
| 4,529,415 | 7/1985 | Szimay ................................... | 55/62 |
| 4,963,168 | 10/1990 | Spencer ................................. | 96/122 |
| 4,966,611 | 10/1990 | Schumacher et al. ................ | 96/111 X |
| 5,389,125 | 2/1995 | Thayer et al. ........................ | 96/111 X |
| 5,542,965 | 8/1996 | Straubinger et al. ................ | 96/112 X |

FOREIGN PATENT DOCUMENTS

| | | |
|---|---|---|
| A0 305 919 | 3/1989 | European Pat. Off. . |
| A0 654 295 | 5/1995 | European Pat. Off. . |
| A23 52 075 | 3/1975 | Germany . |
| A29 28 138 | 1/1981 | Germany . |

*Primary Examiner*—Robert Spitzer
*Attorney, Agent, or Firm*—Merchant, Gould, Smith, Edell, Welter & Schmidt P.A.

[57] ABSTRACT

A process for the purification of gases loaded in particular with chemical residues, in particular of the exhaust air from printing equipment, in which process the gas to be purified is drawn off from the regions producing the impurities and led via piping to an arrangement of adsorber-filter cartridges that serve for the separation of the impurities from the gas and are periodically separated in a cyclical manner from the exhaust flow for the carrying out of a regeneration process. The adsorber material is impinged upon by an expelling medium that is suitable for the cleansing or regeneration of the adsorber material; in addition to a number of adsorber-filter cartridges planned for the continuous carrying out of the purification process and running in the adsorber operation, provision is made for at least one additional adsorber-filter cartridge that is in the regeneration state in a cyclical exchange with in each case one of the other adsorber-filter cartridges; provision is made for at least one additional adsorber-filter cartridge that is operated for a time in a partial-adsorber state, which cartridge, after the conclusion of its regeneration cycle, is connectable with increasing gas throughput to at least one additional adsorber-filter cartridge running in the adsorber operation.

17 Claims, 2 Drawing Sheets

PROCESS FOR PURIFYING GASES LOADED IN PARTICULAR WITH CHEMICAL RESIDUES

This is a continuation of PCT/DE96/00889 application filed May 22, 1996.

FIELD OF THE INVENTION

The invention concerns first of all a process for purifying gases loaded in particular with chemical residues, in particular a process for purifying exhaust air from printing equipment. The invention further concerns a device for the carrying out of such a process.

BACKGROUND OF THE INVENTION

In a known process of the type in question, the gas to be purified is first removed from the regions producing the impurities. Such regions can be, for example, the cases of printing machines, but other elements that pollute gas or air lie within the scope of the invention. According to the prior art, the gas to be purified is led through piping to an arrangement of several adsorber-filter cartridges, in which the impurities are separated from the gas. The adsorber-filter cartridges are filled with an adsorbing medium suitable for purifying gas, for example with activated carbon. In order periodically to regenerate the adsorber-filter cartridges in a cyclical manner, they are separated from the exhaust-air stream. Subsequently, an expelling medium is introduced that is suitable for purifying or regenerating the adsorber material used in the adsorber-filter cartridges, for example water vapor. The cyclically recurring regeneration process generally occurs in this manner: besides a number of adsorber-filter cartridges assigned to the continuous carrying out of the purification process of the gas and thus running in the adsorber operation, provision is made for at least one additional adsorber-filter cartridge that is just now regenerated. The regeneration process cyclically alternates through the several adsorber-filter cartridges.

Now, it becomes apparent in the prior art that after the conclusion of a regeneration process, the regenerated adsorber-filter cartridge cannot immediately and readily be transferred into the adsorber mode. As a rule, freshly regenerated adsorber-filter cartridges are loaded to a high degree with the expelling medium and have a relatively high temperature. This means that, for instance with the use of water vapor as an expelling medium, upon a sudden introduction of a large mass of cold gas an extreme moistening of the gas occurs in the outlet region of the adsorber-filter cartridge. If such gas or such air were to be led, for example, into the case of a printing machine, a normal operation of the printing machine would be impossible.

For these reasons one proceeds first of all to cool down freshly-regenerated adsorber-filter cartridges and to ensure that the water contained in the adsorber material is removed from the filter cartridge. In this process, water vapor loaded with the residue of the filtered-out chemicals is blown into the atmosphere. Furthermore, on the basis of the described problem (the introduction of moisture from the adsorber-filter cartridges into the printing machine cases), with the application of such adsorber-filter cartridges in the field of printing-machine exhaust air purification one has refrained from driving the exhaust air in a recirculating-air system. This means that greater amounts of fresh air must be supplied to the air stream, which fresh air must be warmed up to a greater or lesser degree depending on the outside temperature. This is associated with a not inconsiderable additional energy consumption in the operation of printing machines.

SUMMARY OF THE INVENTION

The problem forming the basis of the invention is to develop a process in such a manner that a driving of the purified gases in the recirculating-air system is made possible, reducing the burden on the environment.

It is considered above all the core of the invention that provision is made for at least one additional adsorber-filter cartridge that is operated at times in a partial-adsorber state, which cartridge, after the conclusion of its regeneration cycle, is switched into the rising gas throughput volume of at least one additional adsorber-filter cartridge running in the adsorber operation. In other words, each adsorber-filter cartridge whose regeneration-cycle period has just concluded is not subjected to a separate cooling process, but rather it is immediately included in the gas circulation of the equipment, with, however, the gas throughput beginning at essentially zero and being slowly controlled upward to the designed maximum gas-throughput value. In this, the gas throughput is kept low so long as within the adsorber-filter cartridge the adsorber material is highly moisture-laden and a high temperature prevails. When the temperature in the adsorber-filter cartridge has fallen and the moistness has diminished, the gas throughput through the freshly regenerated adsorber-filter cartridge is increased. The regenerated adsorber-filter cartridge is thus no longer cooled in a separate time period, but rather is subject to a partially-cool adsorber mode in which it can already take over again in part its adsorber function.

Through this measure it becomes possible to put the totality of the available adsorber-filter cartridges into a recirculating-air system. In practice, for example, five adsorber-filter cartridges might be on hand, one of which is at any one time in a regeneration cycle and one over the same time period is in the partial-cooling mode. As soon as the regeneration cycle is completed, the freshly-regenerated adsorber-filter cartridge is transferred into the partial-cooling mode, another adsorber-filter cartridge is shifted into the regeneration cycle, and three additional adsorber-filter cartridges are in the adsorber-operating state, in which they yield full adsorber performance.

In spite of the fact that during the partial-cooling mode the freshly regenerated adsorber-filter cartridge contains much moisture, by virtue of the low gas-throughput volume it is not to be feared that printing equipment attached to the system will be impinged upon with too much moisture. Rather, with appropriate control of the gas-throughput volume in the partial-cooling mode, a fluctuation of the gas or air moisture in the region of the printing-machine case is attainable precisely within the optimal range.

Tests have shown that it is of advantage when the raising of the gas throughput of the adsorber-filter cartridge running for a time in the partial-adsorber mode proceeds in a continuously increasing manner. This can be achieved through relatively simple control mechanisms.

It can also be advantageous when the raising of the gas-throughput volume of the adsorber-filter cartridge running for a time in the partial-adsorber state or cooling state occurs according to an e-function. This corresponds to the physical processes that take place during the partial-adsorber mode. It is also possible, however, to regulate the raising of the gas-throughput volume of the adsorber-filter cartridge running for a time in the partial-adsorber state, dependent on the temperature of the gas at the outlet or on the moisture content of the gases at the outlet of the cartridge. Further regulation mechanisms can likewise be applied; for example, it can also be of advantage to control the gas-throughput volume dependent on the pollutant load of the gases at the outlet of the cartridge, so that the gas-throughput volume is not necessarily increased, but rather is increased or decreased according to the amount of pollution at the outlet of the cartridge.

The process can be used especially advantageously for the purification of the solvent-loaded exhaust air of large printing systems. Large printing systems employ adsorber-filter cartridge systems with activated-carbon material for the purification of the exhaust air. It has proved true that, by use of the process according to the invention in conjunction with a recirculating-air operation for the exhaust air, the peak pollutant loads going into the outside air can be reduced by 99%. This is an extremely good result from an environmental-technology point of view.

In the carrying out of the process, it has further proved of advantage to let the length of the temporary partial-adsorber-state cycle period correspond to the regeneration-process cycle period, so that the impinging on an adsorber-filter cartridge for the carrying out of the regeneration process of a filter cartridge equals the duration of the partial-cooling mode. The entire system can be regenerated thoroughly in equal-length time periods and the freshly-regenerated adsorber-filter cartridges can be operated partially in the cooling mode in correspondingly long time periods.

A device for the carrying out of the process according to claim 1 provides for at least one element producing a polluted gas. This can be a printing unit, the polluted gas being then the exhaust air of the printing unit. The exhaust air is conducted via a system of pipes to multiple adsorber-filter cartridges, provision being made for blowers in order to maintain a gas flow in the piping. Provision is made for regeneration facilities for the adsorber-filter cartridges, for example water-vapor conduits for the introduction of the expelling medium "hot water vapor" into the filter cartridges, in order to operate the filter cartridges during a regeneration-cycle period. Now, according to the invention, in addition to the adsorber-filter cartridges running in the adsorber operation and at least one adsorber-filter cartridge running at any one time in the regeneration process, there is at least one additional filter cartridge connected to the system of pipes, which cartridge is connectable, via control devices, namely throttle valves and control electronics, in a continuous and adapted manner to the adsorber-filter cartridges running in the adsorber operation. When a continuous connection is spoken of, what is meant is that the connection takes place in such a manner that the gas throughput through the additional adsorber-filter cartridge is slowly increased, in order to permit expelling-medium residues to reach the recirculating-air stream only to a degree that is tolerable for the connected equipment.

With equipment running in a test, a total of five adsorber-filter cartridges has proven advantageous, three adsorber-filter cartridges working in the adsorber operation, one in the regeneration operation, and one in the partial-adsorber operation. Such an operational proportion has shown itself as especially advantageous because approximately 20–25% of the available adsorber-operation working time is necessary for the regeneration process of an adsorber-filter cartridge in normal full operational utilization.

If measurement elements for the determination of the gas moisture content, the gas temperature, or the pollutant proportion in the gas are arranged at the outlet side of each adsorber-filter cartridge, then on the one hand the system can be monitored optimally in its operating state, and on the other hand the output of the measurement elements can also be fed to a control input of the valve control of the system, so that, for example, the raising of the gas throughput through the adsorber-filter cartridge running in the partial-adsorber or cooling mode can be controlled depending on the measurement values at the time.

BRIEF DESCRIPTION OF THE DRAWINGS

The invention is elucidated more precisely with the aid of the implementation examples in the drawing figures. These show.

DETAILED DESCRIPTION OF PREFERRED EMBODIMENTS

Figure 1:
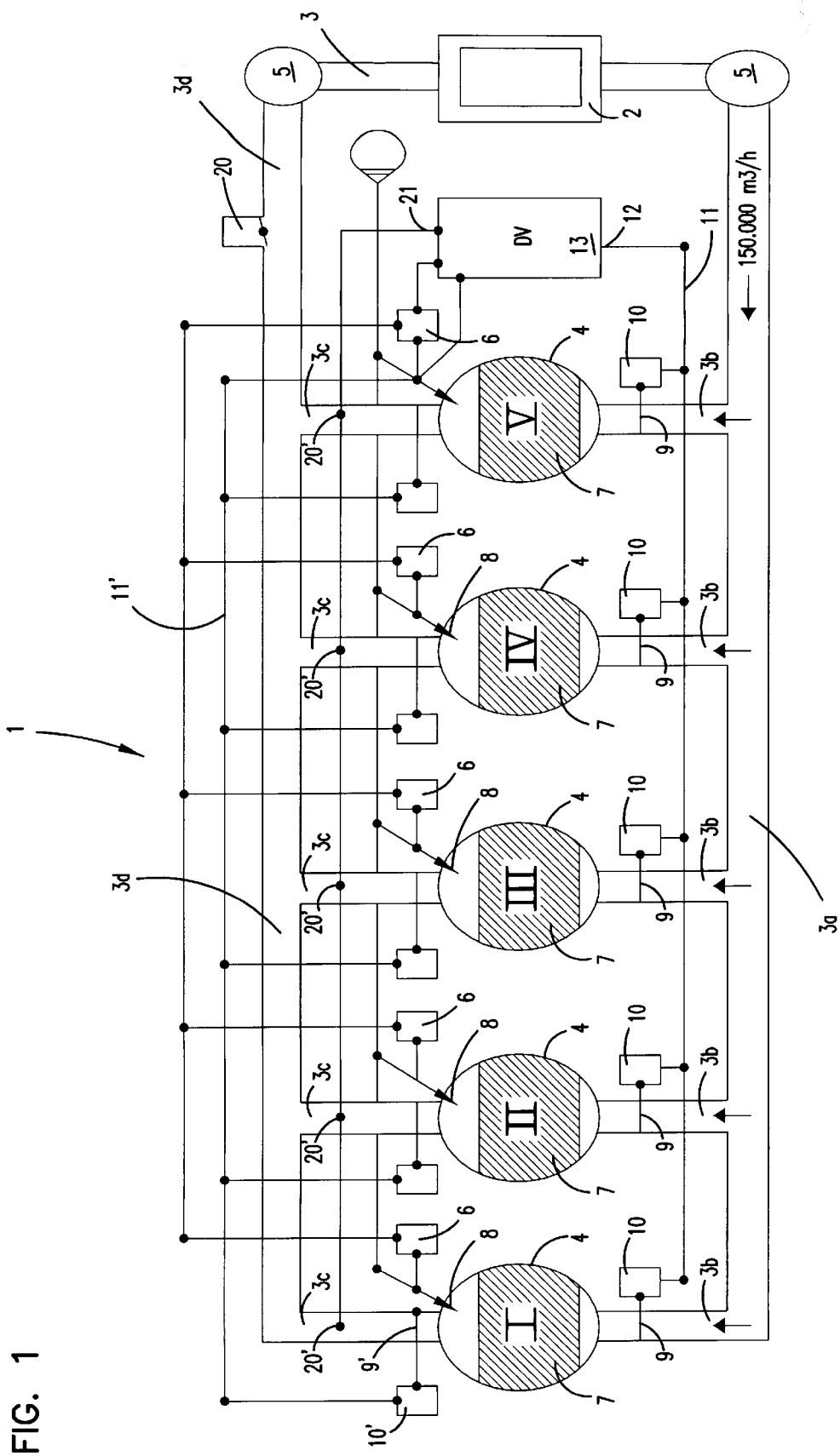
FIG. 1: a schematic representation of an adsorber-filter system with five adsorber-filter cartridges.

With reference to FIG. 1, the system 1 includes first of all an element 2 causing a production of a gas, for example a printing facility with multiple printing machines. Exhaust air from element 2 is lead via a piping system 3 to multiple adsorber-filter cartridges 4 and from there is again fed back in the circular course to the element 2 that is producing the impurities in the gas. In order to ensure a closed recirculating-air course, the piping system 3 consists of a feed-air main pipe 3a, feed-air branch pipes 3b, exhaust-air branch pipes 3c, and an exhaust-air collecting pipe 3d that collects the gas stream exiting the adsorber-filter cartridges 4 via the exhaust-air branch pipes 3c and leads it back to the element 2. A gas stream in the system of pipes 3–3d is generated by means of blowers 5.

Provision is made on the adsorber-filter cartridges 4 for regeneration equipment 6, by means of which the adsorber material 7 contained in the adsorber-filter cartridges, for example activated carbon, can be impinged on with an expelling medium, indicated by an arrow.

Provision is made in the feed-air branch pipes 3b for throttle valves 9 that can be operated via regulating controls 10. The activation of the regulating controls 10 takes place via control wires 11 through the output 12 of a process-control unit 13. Throttle valves 9' are also indicated in the exhaust-air collection pipes 3d, which valves are connected to the process-control unit 13 via regulating controls 10' and a control wire 11'.

In the following, reference will be made to FIG. 2 in order to make clear how the operating state of the adsorber-filter cartridges 4 numbered consecutively with I–V occurs. In cycle phase a, the adsorber-filter cartridge I is in a regeneration cycle, i.e. the regeneration equipment 6 at cartridge I is operated by the process-control unit 13 via the control wire 11 in such a manner that water vapor is delivered to the adsorber material 7 in the adsorber-filter cartridge I. This phase is designated as the regeneration phase. The throttle valves 9, 9' of the adsorber-filter cartridge I are closed during this period.

The adsorber-filter cartridges II, III, and IV are in the adsorber operation, i.e. the throttle valves 9 and 9' of the corresponding adsorber-filter cartridges II–IV are completely open, and the gas streams through the adsorber-filter cartridges II–IV at a flow rate of approximately 50,000 m$^3$/h per adsorber-filter cartridge.

During the cycle phase a, adsorber-filter cartridge V is in a so-called partial-cooling state or partial-adsorber state, i.e. the throttle valves 9, 9' are still closed at the beginning of the cycle phase a and are slowly opened via the assigned regulating controls, so that the gas throughput through the adsorber-filter cartridge V climbs slowly from zero up to a maximum value. Thus the collective gas stream of approximately 150,000 m³/h fed by the blowers 5 is divided among four adsorber-filter cartridges, until cycle segment b begins.

In cycle segment b the now freshly-regenerated adsorber-filter cartridge I is switched into the partial-cooling state, i.e. the throttle valve 9 is slowly opened to a maximum value in the course of cycle segment b. Adsorber-filter cartridge II, on the other hand, is separated from the gas stream by the throttle valve 9 assigned to it and, by means of the regeneration equipment 6, is impinged upon by an expelling medium 8, whereas adsorber-filter cartridges III–V are in the adsorber-operation state with fully-opened throttle valves 9.

Figure 2:
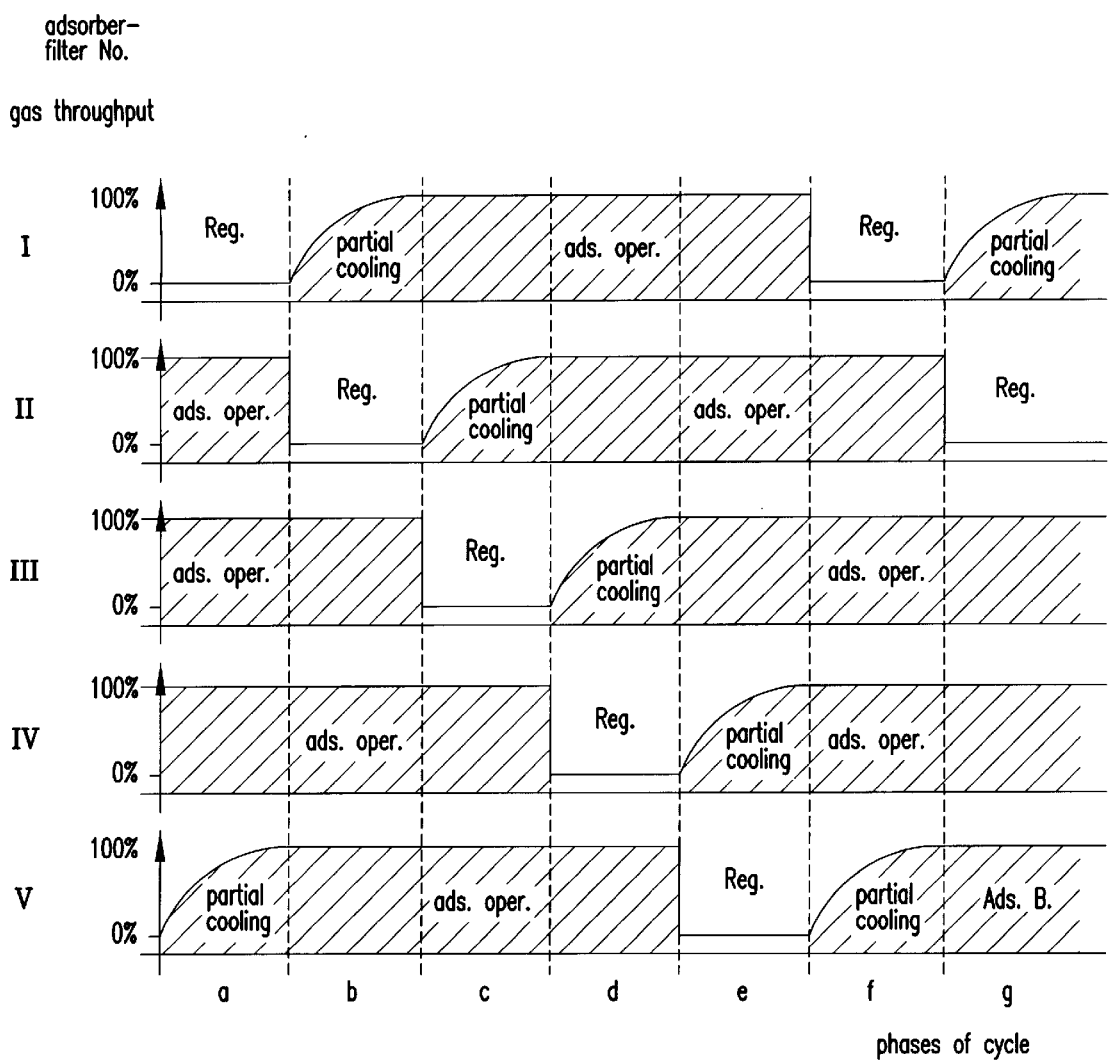
FIG. 2: a graphic representation of the cycle phases "regeneration", "partial-cooling", and "adsorber operation" with five adsorber-filter cartridges.

As is clearly evident from the sequence of the cycle phases c–g in FIG. 2, the regeneration phase, upon each cycle-phase change, is then switched forward to the next adsorber-filter cartridge, likewise the partial-cooling phase and the adsorber-operation phases.

Because of the slow switching-on of the freshly regenerated adsorber-filter cartridges in the subsequent partial-cooling state, the entire system can be run in the recirculating-air operation. An exhaust-air flue, indicated by numeral 20 in FIG. 1, can normally remain closed, so that no gases whatever reach the environment.

Measuring elements 20' may be arranged at the outlet side of each adsorber-filter cartridge 4 for determination of the gas moisture and/or the gas temperature and/or the pollutant proportion in the gas. The output of the measuring elements 20' is connected to a control input 21 of the process-control unit 13.

In conclusion, let it be noted that the invention can also be realized with a different quantity of adsorber-filter cartridges, and also that at any one time a number of adsorber-filter cartridges can be regenerated and partially cooled simultaneously or during overlapping segments. Moreover, it is possible to provide for an excess number of adsorber-filter cartridges relative to the amount of gas to be purified, in order to be able to leave the system running continuously upon, for example, failure of adsorber-filter cartridges, or for maintenance purposes.

We claim:

1. Process for the purification of gases loaded with residues,
   in which process a gas to be purified is drawn off from regions producing impurities and
   led via pipes to an arrangement of adsorber-filter cartridges
   serving for separation of the impurities from the gas,
   the cartridges being periodically separated in a cyclical manner from the exhaust-air stream for the carrying out of a regeneration process, and
   whose adsorber material is impinged upon by an expelling medium that is suitable for the purification of the adsorber material,
   wherein, besides a number of adsorber-filter cartridges provided for the continuous carrying out of the purification process and running in an adsorber operation, at least one additional adsorber-filter cartridge is provided that is in the regeneration state in cyclical exchange with in each case one of the other adsorber-filter cartridges,
   and wherein provision is made for at least one additional adsorber-filter cartridge driven for a time in a partial-adsorber state,
   which filter, after conclusion of its regeneration cycle, is connectable to a rising gas-throughput volume of at least one additional adsorber-filter cartridge running in the adsorber operation.

2. Process according to claim 1, wherein the raising of the gas-throughput volume of the adsorber-filter cartridge running for a time in the partial-adsorber state proceeds in a continuously increasing manner.

3. Process according to claim 1, wherein the raising of the gas-throughput volume of the adsorber filter cartridge running for a time in the partial-adsorber state occurs according to an e-function.

4. Process according to claim 1, wherein the raising of the gas-throughput volume of the adsorber-filter cartridge running for a time in the partial-adsorber state is controlled dependent upon the temperature of the gas at the output of the cartridge.

5. Process according to claim 1, wherein the raising of the gas-throughput volume of the adsorber-filter cartridge running in the partial-adsorber state is regulated dependent upon the moisture content of the gas at the output of the cartridge.

6. Process according to claim 1, being applied in the purification of solvent-loaded exhaust air from printing equipment.

7. Process according to claim 1, wherein steam is used in the regeneration process.

8. Process according to claim 1, wherein activated carbon is applied as adsorber material.

9. Process according to claim 1, wherein the air flowing out of the adsorber-filter-cartridge arrangement is led back to the regions producing the impurities in the air-circulation process, and from there is again led to the input pipes of the adsorber-filter cartridges.

10. Process according to claim 1, wherein an exhaust flue is arranged in a region of the adsorber-filter-cartridge outlets, which flue can be closed off via a closing arrangement.

11. Process according to claim 1, wherein a duration of the temporary partial-adsorber-state cycle segment corresponds to a duration of a regeneration-process cycle segment.

12. Device (1) for purification of gases loaded with residues, comprising:
    at least one element (2) causing a pollution of a gas,
    a multiplicity of adsorber-filter cartridges (4) for purification of the gas,
    a piping system (3) that connects the at least one element (2) with the adsorber-filter cartridges (4),
    blowers (5) for building up a gas flow in the piping system, and
    regeneration equipment (6) for operation upon the adsorber-filter cartridges (4) in a regeneration cycle,
    wherein, in addition to the adsorber-filter cartridges (4; II, III, IV) running in an adsorber operation and at least one adsorber-filter cartridge (4; I) running in a regeneration process, at least one additional adsorber-filter cartridge (4; V) is connected to the piping system (3), which cartridge is continuously connectable, via control devices, to the adsorber-filter cartridges (4; II, III, IV) running in an adsorber operation.

13. Device according to claim 12, wherein the element (2) is a printing machine or an arrangement of printing machines and the piping system (3) feeds the exhaust air of the printing machine in a closed recirculating-air operation.

14. Device according to claim 12, wherein altogether five adsorber-filter cartridges (4; I–V) are provided for, and at any one time three adsorber-filter cartridges work in the adsorber operation, one in the regeneration operation, and one in the partial-adsorber operation.

15. Device according to claim 12, wherein each adsorber-filter cartridge (4) is connected to the piping system (3) via a throttle valve (9) allowing a continuously-controllable opening or closing.

16. Device according to claim 12, wherein measuring elements (20) are arranged at an outlet side of each adsorber-filter cartridge (4) for determination of at least one selected from the group consisting of gas moisture, gas temperature, and pollutant proportion in the gas.

17. Device according to claim 16, wherein an output of the measuring elements (20) is connected to a control input (21) of the process-control unit (13).

* * * * *